(12) United States Patent
Colovic et al.

(10) Patent No.: US 11,001,191 B2
(45) Date of Patent: May 11, 2021

(54) REMOVABLE TIE-DOWN ASSEMBLY

(71) Applicant: GM Global Technology Operations LLC, Detroit, MI (US)

(72) Inventors: Dusan Colovic, Troy, MI (US); Clayton Davis, Madison Heights, MI (US); Mark Pulleyblank, Harrison Township, MI (US); Jeffrey A. Diegel, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 16/436,210

(22) Filed: Jun. 10, 2019

(65) Prior Publication Data

US 2020/0384909 A1    Dec. 10, 2020

(51) Int. Cl.
*B60P 7/08* (2006.01)
*B60P 7/13* (2006.01)
*B60P 7/15* (2006.01)

(52) U.S. Cl.
CPC ............. *B60P 7/132* (2013.01); *B60P 7/0815* (2013.01); *B60P 7/15* (2013.01)

(58) Field of Classification Search
CPC .......... B60P 7/132; B60P 7/0815; B60P 7/15; B60P 7/0807; F16B 21/02; F16B 21/04
USPC ....... 410/8, 10–12, 101, 102, 104, 105, 106, 410/116
See application file for complete search history.

(56) References Cited

U.S. PATENT DOCUMENTS

| | | | |
|---|---|---|---|
| 7,052,220 B1* | 5/2006 | Jutila | B60P 7/0815 410/104 |
| 8,657,542 B2* | 2/2014 | Liu | B60P 7/0815 410/106 |
| 2009/0274531 A1* | 11/2009 | Townson | B60P 7/0815 410/104 |

* cited by examiner

*Primary Examiner* — Stephen T Gordon
(74) *Attorney, Agent, or Firm* — Quinn IP Law (57) ABSTRACT

A tie-down assembly for selective attachment to a structure at an oblong aperture defined thereby and detachment therefrom includes an anchor arranged along an axis. The anchor has an oblong-shaped section configured to be inserted into the structure's oblong aperture. The anchor also has a knob section which turns the anchor's oblong-shaped section about the axis when a torque is applied to the knob section. The assembly also includes a rail mount configured to abut the oblong-shaped section, and defining a pocket for accepting the knob section and limiting rotation of the oblong-shaped section via contact with the knob section. The anchor's oblong-shaped section and the rail mount are together configured to sandwich therebetween material of the structure proximate the oblong aperture after the anchor's oblong-shaped section is inserted into and turned relative to the oblong aperture to thereby attach the tie-down assembly to the structure.

20 Claims, 7 Drawing Sheets

REMOVABLE TIE-DOWN ASSEMBLY

INTRODUCTION

The disclosure relates to a removable tie-down assembly for a cargo compartment of a motor vehicle.

A tie-down is used to hold and restrain objects from shifting around and falling into disarray. Tie-down hardware is typically used to turn webbing into a tie-down strap. Such webbing is generally a strong fabric woven as a flat strip or tube of varying width and fibers often used in place of rope.

There are various categories of tie-down strap hardware that allow for the creation of a virtually unlimited number of different types of tie-down straps. Such pieces of hardware fall into several categories, including fasteners, end fittings, and buckles. Frequently, tie-down hardware is used to keep items inside vehicle cargo compartments from shifting around. Such devices are particularly useful for restraining the contents of pick-up truck beds.

SUMMARY

A tie-down assembly for selective attachment to a structure at an oblong aperture defined thereby and detachment therefrom includes an anchor arranged along an axis. The anchor has an oblong-shaped section configured to be inserted into the oblong aperture defined by the structure. The anchor also has a knob section configured to turn the oblong-shaped section of the anchor about the axis when a torque is applied to the knob section. The tie-down assembly also includes a rail mount configured to abut the oblong-shaped section of the anchor and defining a pocket configured to accept the knob section and limit rotation of the oblong-shaped section via contact with the knob section. The oblong-shaped section of the anchor and the rail mount are together configured to sandwich therebetween material of the structure proximate the oblong aperture after the oblong-shaped section of the anchor is inserted into and turned relative to the oblong aperture. The tie-down assembly is attached to the structure by the material of the structure being sandwiched between the oblong-shaped section of the anchor and the rail mount.

The anchor may include a female fastener centered on the axis and fixed relative to the oblong-shaped section. The tie-down assembly may further include a male fastener configured to extend along the axis through the rail mount and the knob section. The male fastener may be configured to engage the female to thereby turn the oblong-shaped section relative to the oblong aperture, and tighten and fix the tie-down assembly to the structure.

The rail mount may include projections configured press against and apply a force of the tightened tie-down assembly to material of the structure spaced away from the oblong aperture.

The rail mount may include a channel configured to retain a cargo rail.

The male fastener may be additionally configured to extend through the cargo rail when the cargo rail is retained by the rail mount channel.

The knob section may include a cam shape having two lobes spaced 180 degrees apart and configured to limit rotation of the oblong-shaped section via contact between the lobes and walls of the pocket.

The lobes of the cam shape may be in a phased relationship with the oblong-shaped section.

The anchor may additionally include a tapered nose configured to engage the oblong aperture defined by the structure and guide the oblong-shaped section for insertion into the oblong aperture defined by the structure.

The knob section and the oblong-shaped section of the anchor may be structured as a single piece of material, i.e., a unitary component.

The anchor may be formed, e.g., molded, from a plastic material, or constructed from metal.

The structure may define a contour. Furthermore, the rail mount may include a section configured to locate within the contour and thereby position the tie-down assembly relative to the structure.

The aforementioned structure may be that of a bed of a pick-up truck.

The above features and advantages and other features and advantages of the present disclosure are readily apparent from the following detailed description of the best modes for carrying out the disclosure when taken in connection with the accompanying drawings.

DETAILED DESCRIPTION

Figure 1:
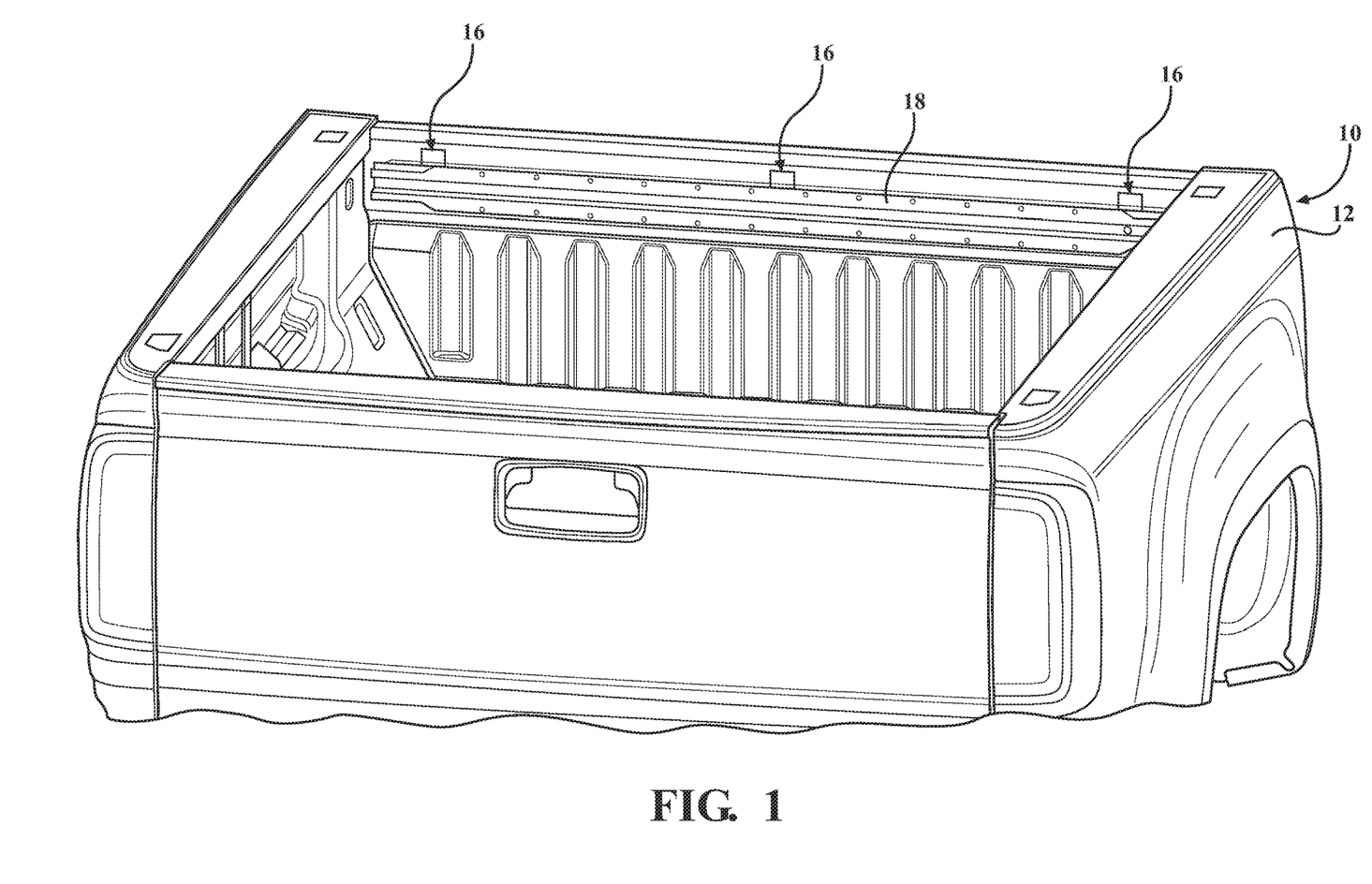
FIG. 1 is a perspective view of inside of a bed of a pick-up truck having a cargo rail attached by a plurality of tie-down assemblies thereto, according to the present disclosure.
Figure 2:
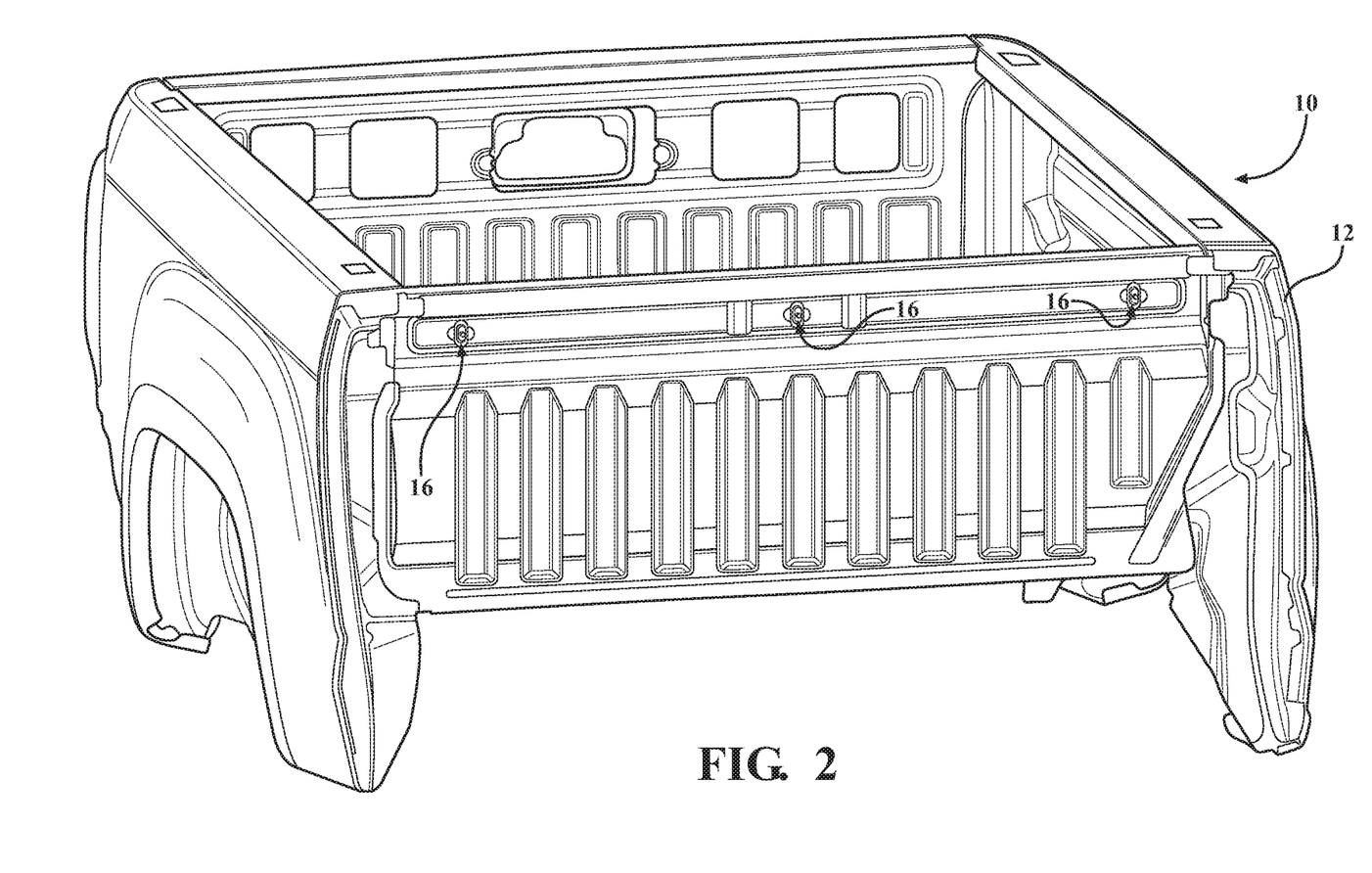
FIG. 2 is a perspective view of an external surface of the bed of the pick-up truck having a cargo rail attached by a plurality of tie-down assemblies thereto, according to the present disclosure.

Referring to the drawings, wherein like reference numbers refer to like components, FIGS. 1 and 2 show a section of a motor vehicle 10 from different perspectives. As shown, the vehicle 10 includes a pick-up bed 12 that is configured as a walled structure for holding various cargo in the vehicle. The pick-up bed 12 defines a plurality of openings or apertures 14. Each aperture 14 is shown as having a generally oblong shape, such as an oval or a rectangle. The oblong shape of the aperture 14 may thus facilitate positional orientation of an item that is engaged therewith. As shown, each of the apertures 14 positions and orients a tie-down assembly 16.

Figure 3:
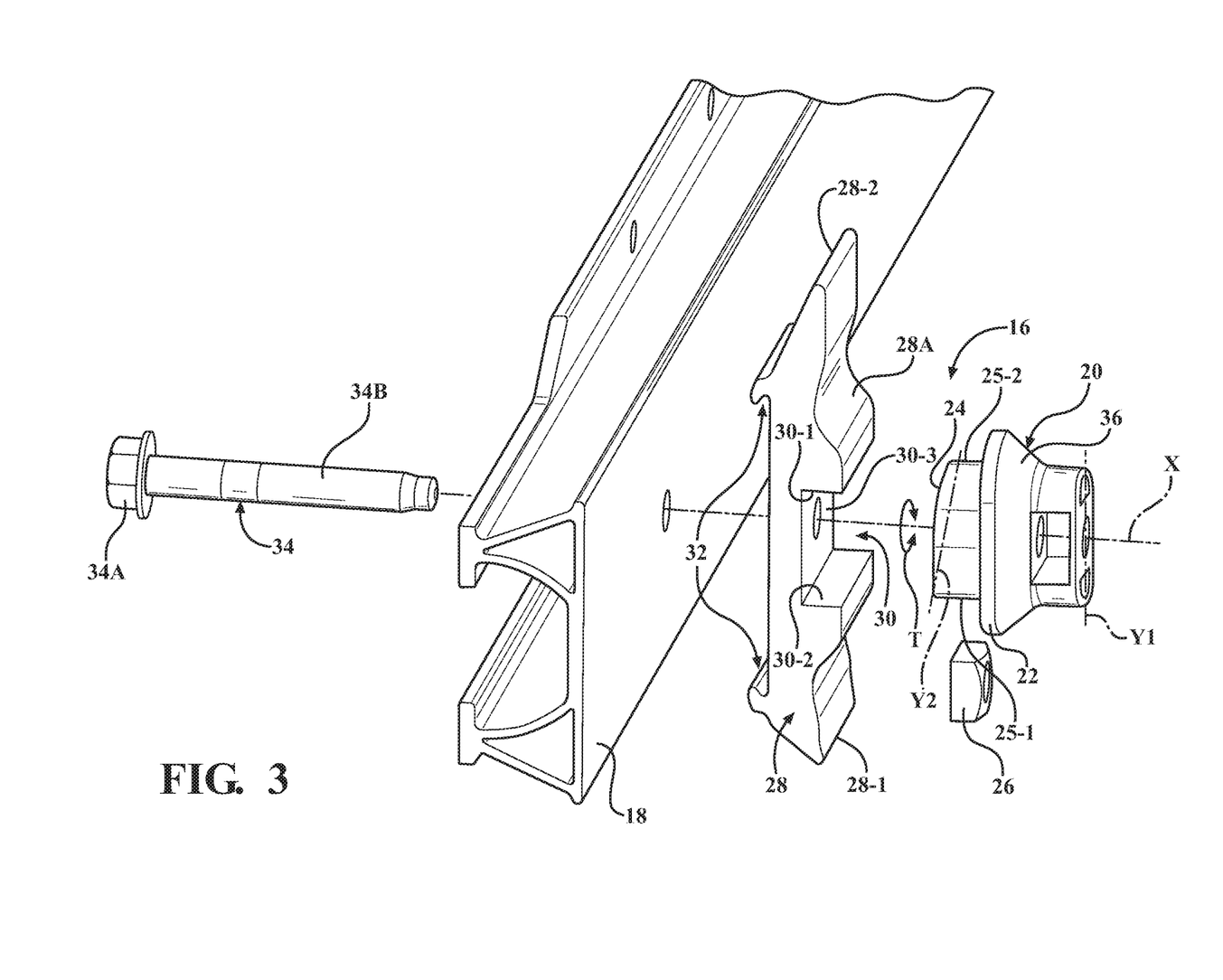
FIG. 3 is a perspective partial view of the cargo rail and a perspective exploded view one of the tie-down assemblies shown in FIGS. 1 and 2, depicting an anchor having an oblong-shaped section and a knob section, according to the present disclosure.

The tie-down assembly 16 is configured for selective attachment to a wall of the pick-up bed 12 by insertion into the aperture 14 and detachment from the pick-up bed. The tie-down assembly 16 is configured to accept an attachment of a cargo rail 18 (shown in FIG. 1) thereto in order to employ such a rail for restraining cargo inside the pick-up bed 12. The tie-down assembly 16 along with the cargo rail 18 may also be employed to accept attachment of various cargo restraining webbing or a tie-down strap (not shown) thereto. As shown in FIG. 3, the tie-down assembly 16 includes an anchor 20 arranged along an axis X. The anchor 20 also includes an oblong-shaped section 22 configured to be inserted into, and fit in its entirety through, the oblong aperture 14 defined by the pick-up bed 12. In other words, the oblong-shaped section 22 is designed and constructed to clear the material geometry and thickness of the pick-up bed 12 proximate to and surrounding the oblong aperture 14. As shown in FIG. 3, a centerline Y1 extends through the major axis of the oblong-shaped section 22.

The anchor 20 additionally includes a knob section 24 configured to turn the oblong-shaped section 22 of the anchor 20 about the axis X when a torque T is applied to the knob section. The anchor 20 may further include a female fastener 26 centered on the axis X and fixed relative to the oblong-shaped section 22. In other words, the female fastener 26 may be fixedly retained in and by, e.g., molded into, the anchor 20. As shown in FIGS. 3, 4, 6, and 7, the female fastener 26 may be configured as a captured nut. The knob section 24 and the oblong-shaped section 22 of the anchor 20 may be separate components assembled together via fasteners. Alternatively, the knob section 24 and the oblong-shaped section 22 of the anchor 20 may be structured as a unitary component from a single piece of material. For example, the anchor 20 may be formed or molded in its entirety from an engineered material. Such a material may be a type of a plastic, for example a glass-filled nylon. Alternatively, the anchor 20 may be constructed from other rigid materials, such as various metals, and either cast into net shape and/or machined into final form therefrom.

The tie-down assembly 16 additionally includes a rail mount 28 configured to abut the oblong-shaped section 22 of the anchor 20. As shown in FIG. 3, the rail mount 28 defines a pocket 30 configured to accept the knob section 24. The pocket 30 is generally defined by three walls. The three walls include two parallel walls—a sidewall 30-1 and a sidewall 30-2, and a connecting or perpendicular wall 30-3. The knob section 24 may include a cam shape having two lobes 25-1 and 25-2 spaced 180 degrees apart. The lobes 25-1 and 25-2 are configured to limit rotation of the oblong-shaped section via contact between the subject lobes and walls 30-1, 30-2 of the pocket 30. A centerline Y2 extends through each of the two lobes 25-1, 25-2 (shown in FIG. 3).

Figure 4:
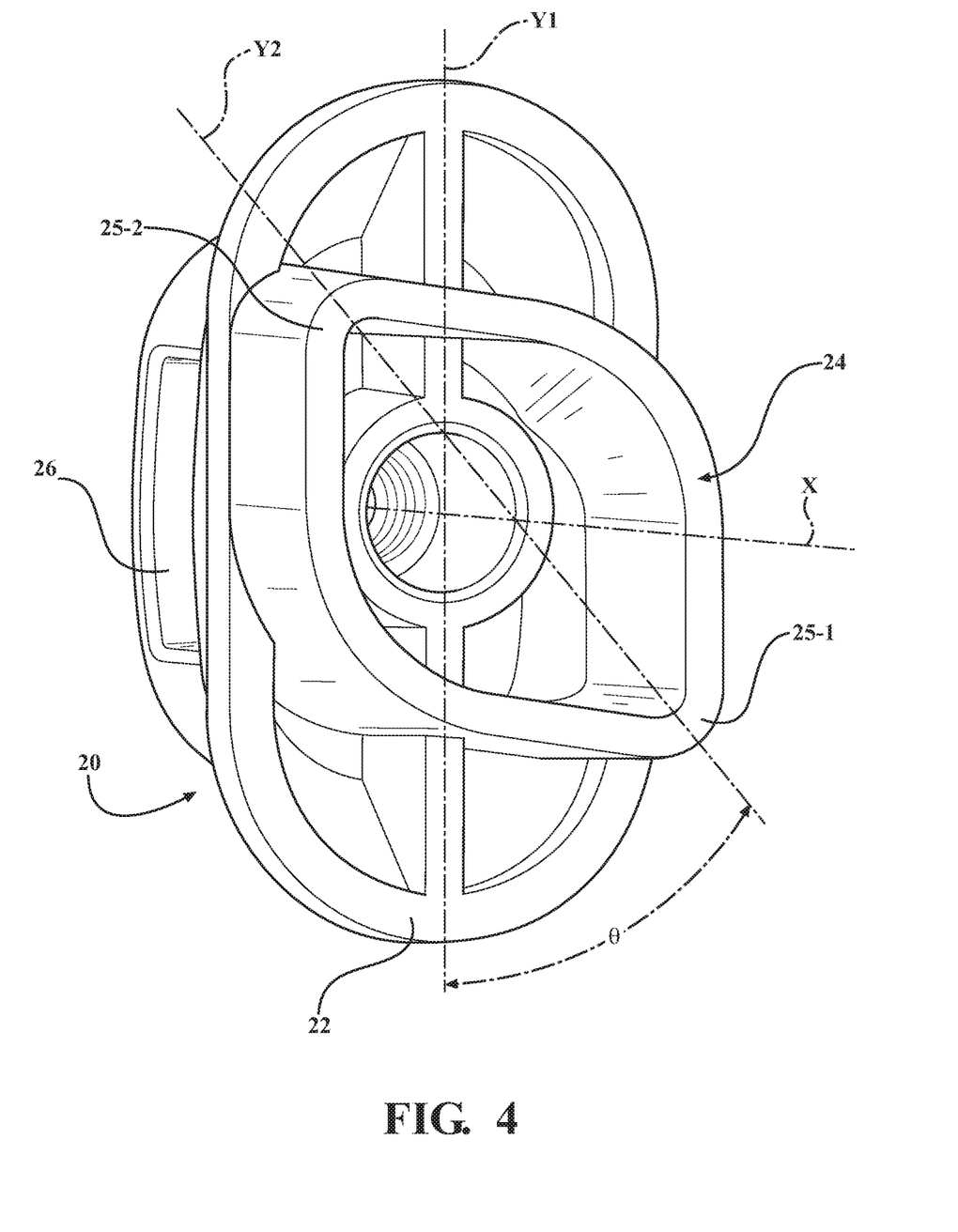
FIG. 4 is a perspective view of an anchor of the tie-down assembly shown in FIG. 3, depicting a phased relationship between the oblong-shaped section and lobes of the knob section, according to the present disclosure.

FIG. 4 shows a phased relationship between the lobes 25-1, 25-2 of the cam shape and the oblong-shaped section 22. Specifically, as shown, the centerline Y2 is arranged at an angle θ relative to the centerline Y1, thus establishing a relative position of the two lobes 25-1, 25-2 with respect to the oblong-shaped section 22. The subject angle θ may be substantially equal to 45 degrees. The 45 degree angle defines a relative position of the two lobes 25-1, 25-2 with respect to the oblong-shaped section 22 such that, rotated in one direction, the lobes will contact the walls 30-1, 30-2 when the oblong-shaped section aligns with the oblong aperture 14, while, rotated in the opposite direction, the same lobes 25-1, 25-2 will contact the walls when the oblong-shaped section ends up transverse to the oblong aperture 14.

The above-described relationship between the centerline Y1 and centerline Y2 may thus be exploited to constrain the lobes 25-1, 25-2 via the walls 30-1, 30-2 of the pocket 30 to achieve selective installation and removal of the tie-down assembly 16. Specifically, in one direction of anchor 20 rotation, the subject relationship between centerlines Y1 and Y2 is intended to maintain appropriate alignment of the oblong-shaped section 22 relative to the oblong aperture 14 for insertion of the anchor. In the opposite direction of anchor 20 rotation, the subject relationship between centerlines Y1 and Y2 is intended to position the oblong-shaped section 22 substantially perpendicular to the oblong aperture 14 for attachment of the tie-down assembly 16 to the pick-up bed 12.

As shown in FIG. 3, the rail mount 28 may also include projections 28-1 and 28-2 arranged 180 degrees apart. Each projection 28-1 and 28-2 extends outwardly from and generally orthogonally to the axis X. The projections 28-1 and 28-2 are configured to apply a clamping force of the tightened tie-down assembly 16 to material 12A (shown in FIG. 5) of the pick-up bed 12 somewhat distal or spaced away from the oblong aperture 14. The projections 28-1 and 28-2 are additionally configured to spread the fastening load of the tie-down assembly 16 across a sufficient area on the pick-up bed 12 such that the tie-down assembly may withstand significant forces from the attached cargo rail 18 while restraining cargo.

Figure 5:
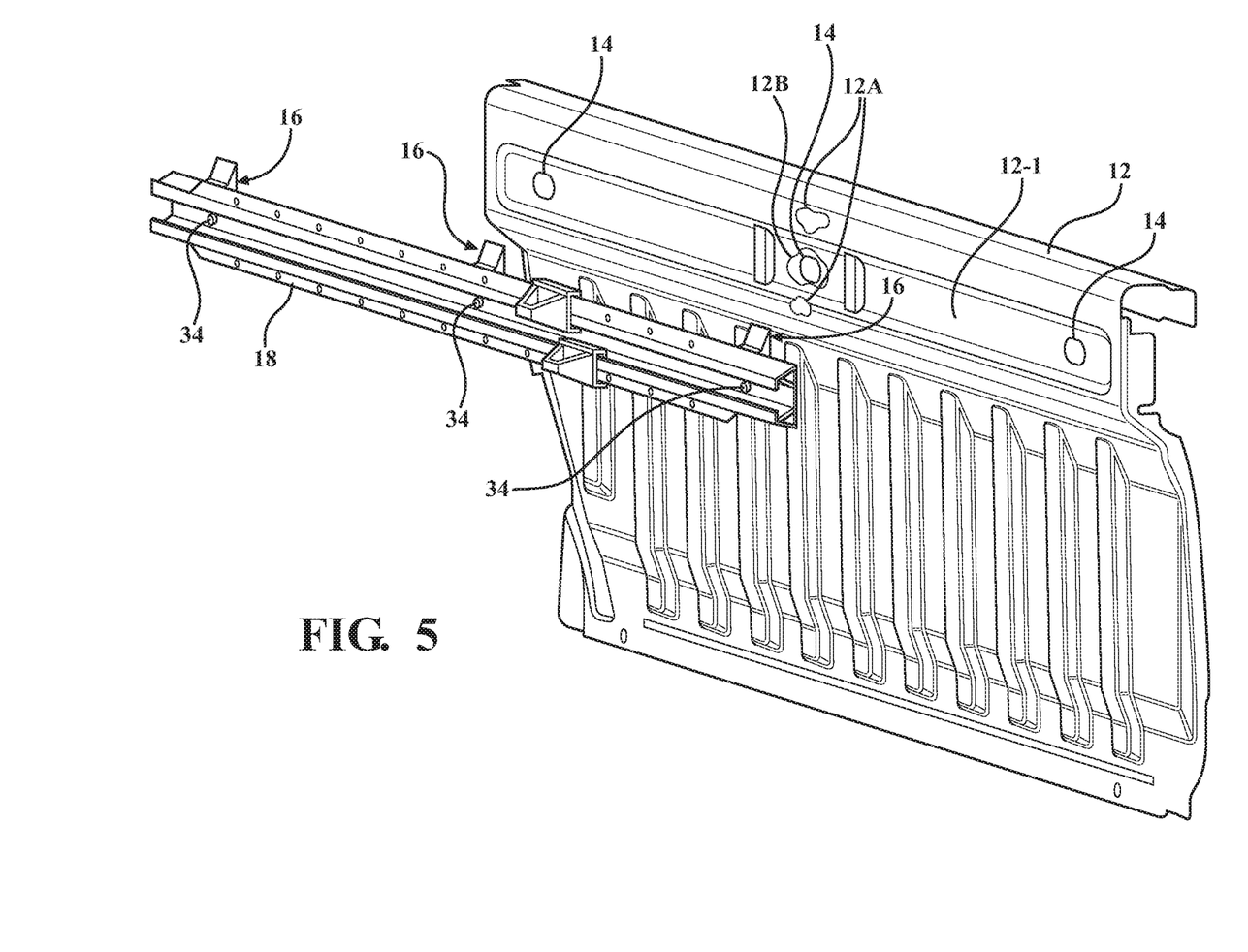
FIG. 5 is a perspective view of the cargo rail preassembled with the plurality of tie-down assemblies, but prior to attachment to the bed of the pick-up truck at oblong apertures.
Figure 6:
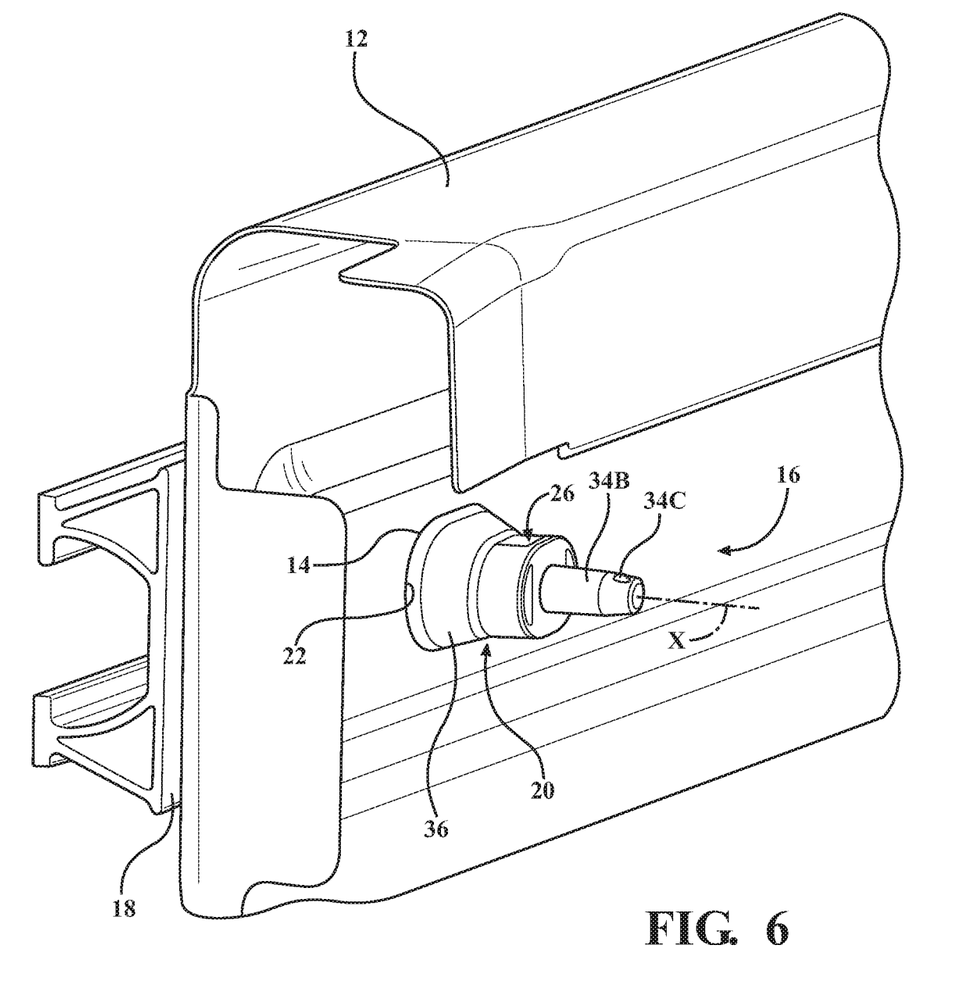
FIG. 6 is a perspective view of the anchor of the tie-down assembly inserted into the oblong aperture of the bed of the pick-up truck shown in FIG. 5, but prior to fastening of the tie-down assembly thereto.
Figure 7:
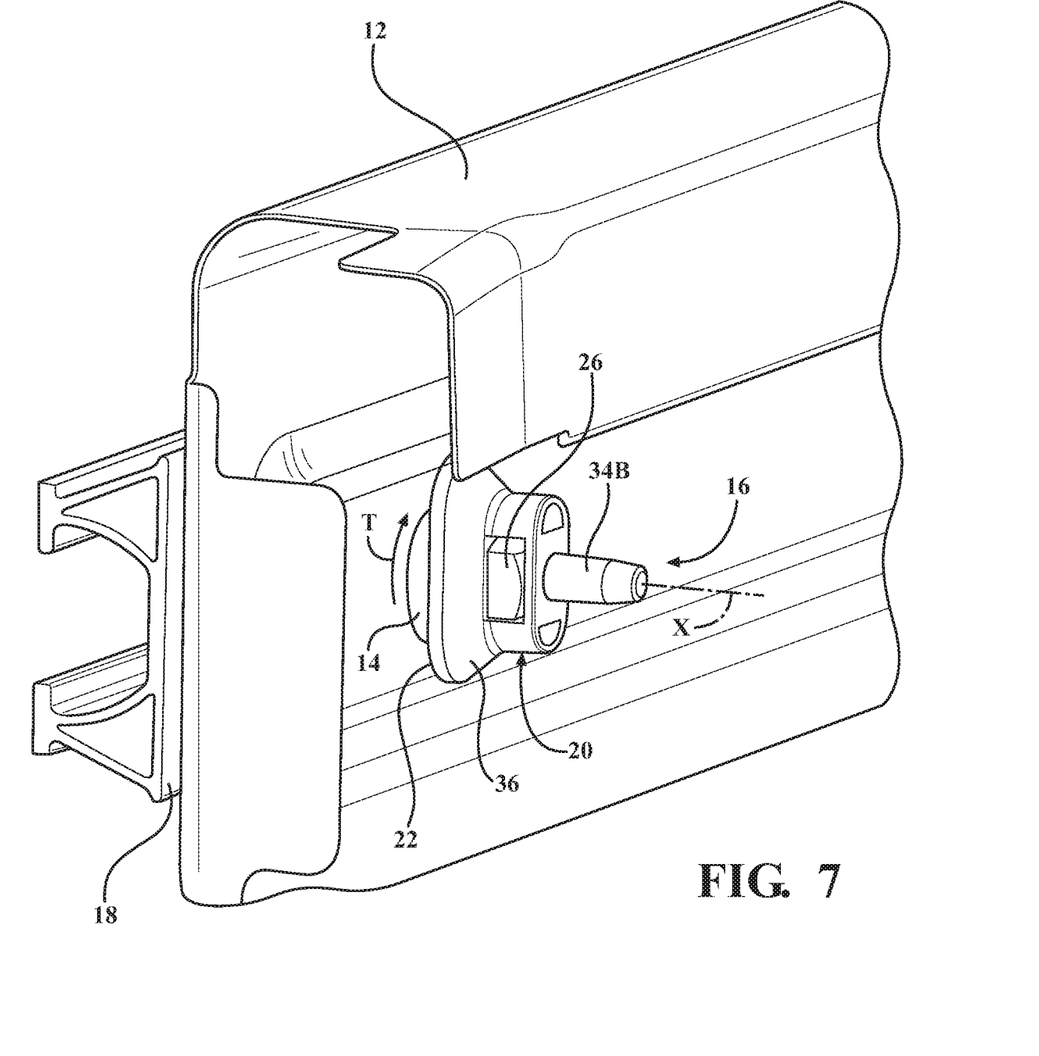
FIG. 7 is a perspective view of the anchor of the tie-down assembly fastened to the bed of the pick-up truck.

The rail mount 28 may additionally include a channel 32 configured to retain the cargo rail 18. Specifically, the cargo rail 18 may be slid into the channel 32 prior to the tie-down assemblies 16 being inserted into and tightened at the apertures 14 defined by the pick-up bed 12. As shown in FIG. 5, the pick-up bed 12 may define a contour 12-1. The contour 12-1 may be a channel formed in a wall of the pick-up bed 12. Such a channel may be configured to extend across each of the oblong apertures 14 on the subject wall. Furthermore, the rail mount 28 may include a section 28A configured to project into and locate within the contour 12-1, to thereby position the tie-down assembly 16 relative to the pick-up bed 12 for appropriate positioning of the cargo rail 18 with respect to the vehicle 10.

Each oblong aperture 14 is locally defined by material of the pick-up bed 12 surrounding or proximate the subject aperture, which is hereinafter identified via numeral 12B (shown in FIG. 5). The oblong-shaped section 22 of the anchor 20 and the rail mount 28 are together configured to sandwich therebetween material 12B of the pick-up bed 12 proximate the oblong aperture 14 after the oblong-shaped section 22 is inserted into and turned relative to the oblong aperture 14. By sandwiching material 12B between the oblong-shaped section 22 and the rail mount 28, the tie-down assembly 16 may be attached to the pick-up bed 12. The tie-down assembly 16 may further include a male fastener 34 configured to extend along the axis X through the perpendicular wall 30-3 of the rail mount 28 and the knob section 24. The male fastener 34 is configured to threadably engage the female fastener 26 to thereby tighten and fix the tie-down assembly 16 to the pick-up bed 12. As shown in FIG. 3, the male fastener 34 may be a bolt or a screw.

As shown in FIG. 5, the male fastener 34 may be further configured to extend through the cargo rail 18 when the cargo rail is engaged with and retained by the rail mount channel 32. As shown in FIG. 3, the male fastener 34 may include a bolt head 34A and a threaded portion 34B. An anti-disengagement feature 34C may be added to the male fastener 34, and specifically to the distal end of threaded portion 34B (shown in FIG. 6). The anti-disengagement feature 34C is intended to limit the ability of the male fastener 34 to completely disengage the female fastener 26 during removal of the tie-down assembly 16 from the pick-up bed 12. The anti-disengagement feature 34C may be configured as a deformed portion of the fastener threads, a non-threaded stop affixed to the distal end of the threaded portion 34B, or an active, such as spring-loaded, one-way stop that permits the male fastener to be engaged with, but not disengaged from the female fastener 26 (not shown).

Additionally, the walls 30-1, 30-2 of the pocket 30 are configured to define a physical travel or rotation limit for the knob section 24 when the knob section is turned by friction between the male fastener 34 and the female fastener 26. The anchor 20 may additionally include a tapered nose 36 configured to engage the oblong aperture 14 and guide the oblong-shaped section 22 for insertion into the oblong aperture defined by the pick-up bed 12. The friction in the threads between the female fastener 26 and the male fastener 34 also tends to turn the oblong-shaped section 22 relative to the oblong aperture 14 for removal of the tie-down assembly 16 from the pick-up bed 12. Furthermore, contact between the lobes 25-1 and 25-2 and walls 30-1, 30-2 of the pocket also facilitates maintaining of the oblong-shaped section 22 for clearing the oblong aperture 14 and the removal of the tie-down assembly 16 from the pick-up bed 12, as will be described in detail below.

In operation, the tie-down assembly 16 may be pre-assembled with the cargo rail 18 inserted into the channel 32 of the rail mount 28 and the male fastener 24 partially threaded into the female fastener 26. The partially threaded male fastener 34 into the female fastener 26 leaves the assembly loose, and leaves space between the projections 28-1, 28-2 and the material 12A of the pick-up bed 12 for operator access to the lobes 25-1, 25-2. The lobes 25-1, 25-2, being constrained by the walls 30-1, 30-2 of the pocket 30, are rotated by the operator of the tie-down assembly 16 to pre-position the knob section 24, such that the oblong-shaped section 22 becomes generally aligned with the oblong aperture 14 for insertion therein. As described above, the tapered nose 36 of the anchor 20 engages the oblong aperture 14 of the pick-up bed 12, and then the nose taper adjusts orientation of the oblong-shaped section 22 and guides the oblong-shaped section into the oblong aperture 14.

Once the oblong-shaped section 22 has been inserted into the oblong aperture 14 (shown in FIG. 6), the male fastener 34 may be tightened into the female fastener 26. As the assembly is tightened, the friction between the threads of the male fastener 34 and the female fastener 26 will turn the oblong-shaped section 22 until the lobes 25-1, 25-2 contact the walls 30-1, 30-2 of the pocket 30. Once the lobes 25-1, 25-2 contact the walls 30-1, 30-2 of the pocket 30, the oblong-shaped section 22 will be positioned generally perpendicular to the oblong aperture 14 (shown in FIG. 7) and thereby fasten the tie-down assembly 16 to the pick-up bed 12. As the male fastener 34 continues to be tightened, the tie-down assembly 16 will be fixed to the pick-up bed 12. In the process, the projections 28-1 and 28-2 of the rail mount 28 will spread the fastening load of the tie-down assembly 16 across material 12A of the pick-up bed 12 for supporting the cargo rail 18 and restraining cargo.

Removal of the tie-down assembly 16 from the pick-up bed 12 may be accomplished by a few turns of the male fastener 34 in the loosening direction. Due to the friction between the threads of the male fastener 34 and the female fastener 26, the oblong-shaped section 22 will turn in the opposite to the direction it was turned when the male fastener was being tightened. The oblong-shaped section 22 will continue to turn by the loosening action of the male fastener 34 until the lobes 25-1, 25-2 contact the walls 30-1, 30-2 of the pocket 30, when the oblong-shaped section will become aligned with the oblong aperture 14. Once the oblong-shaped section 22 becomes aligned with the oblong aperture 14 in every tie-down assembly 16 connecting the cargo rail 18 to the pick-up bed 12, the subject tie-down assemblies may be pulled out of and detached along with the rail mounts 28 and the cargo rail 18 from the pick-up bed.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A tie-down assembly for selective attachment to a structure at an oblong aperture defined thereby and detachment therefrom, the tie-down assembly comprising:
    an anchor arranged along an axis and including:
        an oblong-shaped section configured to be inserted into the oblong aperture defined by the structure; and
        a knob section configured to turn the oblong-shaped section of the anchor about the axis when a torque is applied to the knob section; and
    a rail mount configured to abut the oblong-shaped section of the anchor and defining a pocket configured to accept the knob section and limit rotation of the oblong-shaped section via contact with the knob section;
    wherein the oblong-shaped section of the anchor and the rail mount are together configured to sandwich therebetween material of the structure proximate the oblong aperture after the oblong-shaped section of the anchor is inserted into and turned relative to the oblong aperture to thereby attach the tie-down assembly to the structure.

2. The tie-down assembly of claim 1, wherein the anchor includes a female fastener centered on the axis and fixed relative to the oblong-shaped section, the tie-down assembly further comprising a male fastener configured to extend along the axis through the rail mount and the knob section, and configured to engage the female fastener to thereby turn the oblong-shaped section relative to the oblong aperture, and tighten and fix the tie-down assembly to the structure.

3. The tie-down assembly of claim 2, wherein the rail mount includes projections configured to apply a force of the tightened tie-down assembly to material of the structure spaced away from the oblong aperture.

4. The tie-down assembly of claim 2, wherein the rail mount includes a channel configured to retain a cargo rail.

5. The tie-down assembly of claim 4, wherein the male fastener is additionally configured to extend through the cargo rail when the cargo rail is retained by the channel of the rail mount.

6. The tie-down assembly of claim 1, wherein the knob section has a cam shape with two lobes spaced 180 degrees apart, and wherein the cam shape is configured to limit rotation of the oblong-shaped section via contact between the two lobes and walls of the pocket.

7. The tie-down assembly of claim 6, wherein the lobes of the cam shape are in a phased relationship with the oblong-shaped section.

8. The tie-down assembly of claim 1, wherein the anchor additionally includes a tapered nose configured to engage the oblong aperture defined by the structure and guide the oblong-shaped section for insertion into the oblong aperture defined by the structure.

9. The tie-down assembly of claim 1, wherein the knob section and the oblong-shaped section of the anchor are structured as a unitary component.

10. The tie-down assembly of claim 1, wherein the structure defines a contour and the rail mount includes a section configured to locate within the contour and thereby position the tie-down assembly relative to the structure.

11. A motor vehicle comprising:
    a pick-up bed defining an oblong aperture; and
    a tie-down assembly configured to be selectively attached to the pick-up bed at the oblong aperture and detached therefrom, the tie-down assembly comprising:
        an anchor arranged along an axis and including:
            an oblong-shaped section configured to be inserted into the oblong aperture defined by the pick-up bed; and
            a knob section configured to turn the oblong-shaped section of the anchor about the axis when a torque is applied to the knob section; and
        a rail mount configured to abut the oblong-shaped section of the anchor and defining a pocket configured to accept the knob section and limit rotation of the oblong-shaped section via contact with the knob section;
    wherein the oblong-shaped section of the anchor and the rail mount are together configured to sandwich therebetween material of the pick-up bed proximate the oblong aperture defined by the pick-up bed after the oblong-shaped section of the anchor is inserted into and turned relative to the oblong aperture to thereby attach the tie-down assembly to the pick-up bed.

12. The motor vehicle of claim 11, wherein the anchor includes a female fastener centered on the axis and fixed relative to the oblong-shaped section of the anchor, the tie-down assembly further comprising a male fastener configured to extend along the axis through the rail mount and the knob section, and configured to engage the female fastener to thereby turn the oblong-shaped section relative to the oblong aperture, and tighten and fix the tie-down assembly to the pick-up bed.

13. The motor vehicle of claim 12, wherein the rail mount includes projections configured to apply a force of the tightened tie-down assembly to material of the pick-up bed spaced away from the oblong aperture.

14. The motor vehicle of claim 12, wherein the rail mount includes a channel configured to retain a cargo rail.

15. The motor vehicle of claim 14, wherein the male fastener is additionally configured to extend through the cargo rail when the cargo rail is retained by the channel of the rail mount.

16. The motor vehicle of claim 11, wherein the knob section has a cam shape with two lobes spaced 180 degrees apart, and wherein the cam shape is configured to limit rotation of the oblong-shaped section via contact between the two lobes and walls of the pocket.

17. The motor vehicle of claim 16, wherein the lobes of the cam shape are in a phased relationship with the oblong-shaped section.

18. The motor vehicle of claim 11, wherein the anchor additionally includes a tapered nose configured to engage the oblong aperture defined by the pick-up bed and guide the oblong-shaped section for insertion into the oblong aperture defined by the pick-up bed.

19. The motor vehicle of claim 11, wherein the knob section and the oblong-shaped section of the anchor are structured as a unitary component.

20. The motor vehicle of claim 11, wherein the pick-up bed defines a contour and the rail mount includes a section configured to locate within the contour and thereby position the tie-down assembly relative to the pick-up bed.

* * * * *